(12) United States Patent
Levy et al.

(10) Patent No.: US 9,590,437 B2
(45) Date of Patent: Mar. 7, 2017

(54) WALL CHARGER

(71) Applicant: NAVAJO MANUFACTURING COMPANY, INC., Denver, CO (US)

(72) Inventors: Gordon Levy, Golden, CO (US); David Lee Martin, Highlands Ranch, CO (US); Shawn A. Shelton, Highlands Ranch, CO (US)

(73) Assignee: Navajo Manufacturing Company, Inc., Denver, CO (US)

( * ) Notice: Subject to any disclaimer, the term of this patent is extended or adjusted under 35 U.S.C. 154(b) by 191 days.

(21) Appl. No.: 14/228,984

(22) Filed: Mar. 28, 2014

(65) Prior Publication Data
US 2015/0280479 A1  Oct. 1, 2015

(51) Int. Cl.
*H02J 7/02* (2016.01)
*H02J 7/00* (2006.01)

(52) U.S. Cl.
CPC .......... *H02J 7/0055* (2013.01); *H02J 7/0042* (2013.01); *H02J 2007/0062* (2013.01)

(58) Field of Classification Search
CPC .............................. H02J 7/0042; H02J 7/0055
USPC ........................................................ 320/111
See application file for complete search history.

(56) References Cited

U.S. PATENT DOCUMENTS

| | | |
|---|---|---|
| D478,310 S | 8/2003 | Andre et al. |
| 7,126,066 B1 * | 10/2006 | Corcino ................. H01H 9/285 200/318.2 |
| D616,363 S | 5/2010 | Weng |
| D617,730 S | 6/2010 | Mosiello |
| 7,766,698 B1 | 8/2010 | De Iuliis et al. |
| 8,222,773 B2 | 7/2012 | De Iuliis et al. |
| D682,781 S | 5/2013 | Wakafuji et al. |
| D694,183 S | 11/2013 | Matsuoka et al. |
| D694,185 S | 11/2013 | Matsuoka et al. |
| D704,631 S | 5/2014 | Levy |
| D705,159 S | 5/2014 | Levy et al. |
| D708,131 S | 7/2014 | Miller et al. |
| D711,824 S | 8/2014 | Matsuoka et al. |
| D715,734 S | 10/2014 | Levy |
| D715,735 S | 10/2014 | Levy |
| D719,093 S | 12/2014 | Levy et al. |
| 2007/0159133 A1 * | 7/2007 | Kang .................... H02J 7/0042 320/107 |
| 2009/0045774 A1 * | 2/2009 | Rayl .................... H01M 10/488 320/114 |
| 2009/0284221 A1 * | 11/2009 | Liao ....................... H01R 31/06 320/111 |
| 2011/0084660 A1 * | 4/2011 | McSweyn .......... H01R 13/6675 320/111 |
| 2011/0156645 A1 * | 6/2011 | Yang ..................... H02J 7/0042 320/110 |
| 2012/0274155 A1 | 11/2012 | DeIuliis et al. |
| 2014/0152257 A1 | 6/2014 | Miller et al. |

(Continued)

*Primary Examiner* — Suresh Memula
(74) *Attorney, Agent, or Firm* — Studebaker & Brackett PC

(57) ABSTRACT

A wall charger for connection to an AC outlet. The wall charger includes a pair of pivotal AC prongs which engage within the electrical outlet to provide electrical connection to the wall charger. The wall charger includes one or two USB ports for electrical charging of a device from the connection to the AC outlet. The wall charger includes a cylindrical compartment for housing a bullet charger in a concealed manner. The bullet charger may be maintained within the housing for storage purposes.

16 Claims, 16 Drawing Sheets

(56) References Cited

U.S. PATENT DOCUMENTS

2014/0328076 A1* 11/2014 Firman, II ......... H01R 13/6675
362/511

* cited by examiner

WALL CHARGER

FIELD OF THE INVENTION

The present invention relates to the charging of electronic devices in an automobile and at home. A compact home wall charger provides convenient storage space for an automobile miniature charger in a compartment of the home wall charger.

BACKGROUND OF THE INVENTION

With the increasing use of smart phones and other electronic devices in an automobile, charging capability must be provided within the confines of the automobile. Oftentimes, electronic devices require the use of a USB port to connect the electronic device to a source of charging electricity. This can be accomplished by the use of a device which is inserted into a charging port or by use of an adaptor inserted into a port formally known as a "cigarette lighter" socket.

One charging device used in automobiles is, based upon its shape, commonly referred to as a "bullet charger". These devices have been miniaturized to the point that it is difficult to keep track of them within the shifting environments of an interior of an automobile. Therefore, it is necessary to keep track of the location of these bullet chargers so that they do not get lost within an automobile.

The bullet chargers consist of an elongated body having opposed side spring electrical contacts located on opposite sides of an insulating body. A lower extremity or terminal, distal end, usually includes a spring biased connection button for connection with one polarity of an electric terminal located at the base of the charging port or cigarette lighter socket. The opposed electrical side contacts provide the opposite polarity contact located on the side wall of the charging port or cigarette lighter socket.

At an exposed proximal end of the cylindrical body, is located one or two USB ports. An indicator light is usually also found at the proximal end to indicate a secure connection between a USB charging cable and the bullet charger.

SUMMARY OF THE INVENTION

It is an object of the present invention to provide a home wall charger for connection to an AC electrical outlet. The wall charger includes a pair of pivotal AC prongs which engage within the electrical outlet to provide electrical connection to the wall charger. The wall charger includes one or two USB ports for electrical charging of a device with the electricity from the connection to the AC outlet.

In addition, the wall charger includes a cylindrical compartment in a housing for containing a bullet charger in a concealed manner. The bullet charger may be maintained within the housing for storage purposes. Optionally, the bullet charger may be electrically connected when inserted into the cylindrical compartment of the housing for electrical communication with the AC outlet.

In this embodiment, an AC to DC power converter is incorporated into the housing so that the bullet charger, which normally cooperates with a DC electrical source of an automobile, is configured to cooperate, for charging purposes, with an AC outlet. In this embodiment, an additional one or two USB charging ports are thereby provided within a home for charging by the bullet charger in addition to the charging USB ports of the wall charger.

Accordingly, it is an object of the present invention to provide a home wall charger having a pair of pivotal prongs for inter-engagement with an AC outlet and a cylindrical compartment for containing a bullet charger.

It is another object of the present invention to provide a wall charger having a pair of pivotal prongs for inter-engagement with an AC outlet and a cylindrical compartment for containing a bullet charger where the cylindrical compartment includes a movable cover for containing the bullet charger.

It is still yet another object of the present invention to provide a wall charger having a pair of pivotal prongs for inter-engagement with an AC outlet and a cylindrical compartment for containing a bullet charger where the cylindrical compartment includes a movable cover for containing the bullet charger and the cover is movably mounted on a housing of the wall charger to provide access to the bullet charger.

It is still yet another object of the present invention to provide a wall charger having a pair of pivotal prongs for inter-engagement with an AC outlet and a cylindrical compartment for containing a bullet charger where the cylindrical compartment includes a movable cover for containing the bullet charger and the cover is movably mounted on the wall charger to provide access to the bullet charger with the cover slidably or pivotally mounted in orthogonal directions on the wall charger.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the invention disclosed herein, and are for illustrative purposes only. Other embodiments that are substantially similar can use other components that have a different appearance.

DETAILED DESCRIPTION OF THE PREFERRED EMBODIMENTS

Figure 1:
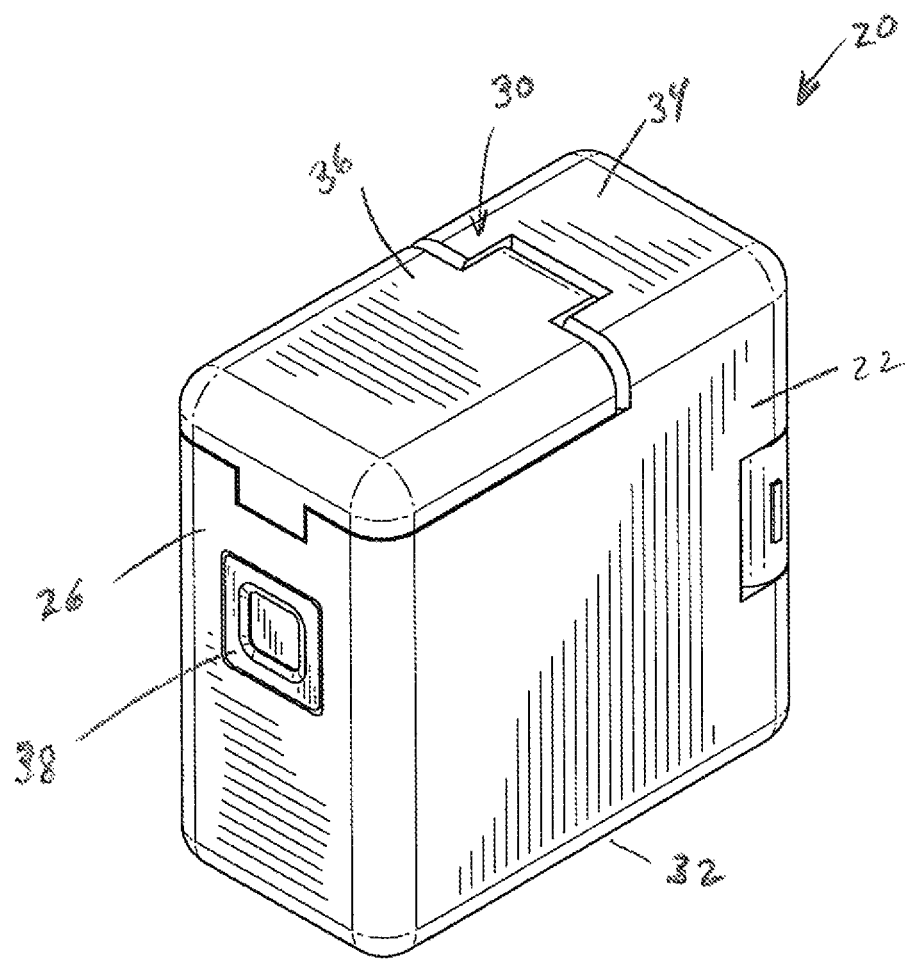
FIG. 1 is a perspective view of one embodiment of a wall charger of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

In the wall charger 20 shown in FIGS. 1 through 5, the wall charger includes a housing having opposed sidewalls 22, 24, opposed end walls 26, 28, top wall 30 and bottom 32. As shown in FIG. 1, the top wall 30 is divided between a stationary end portion 34 and a pivotal cover member 36. The cover member is released by depression of release button 38 located in front wall 26.

Figure 2:
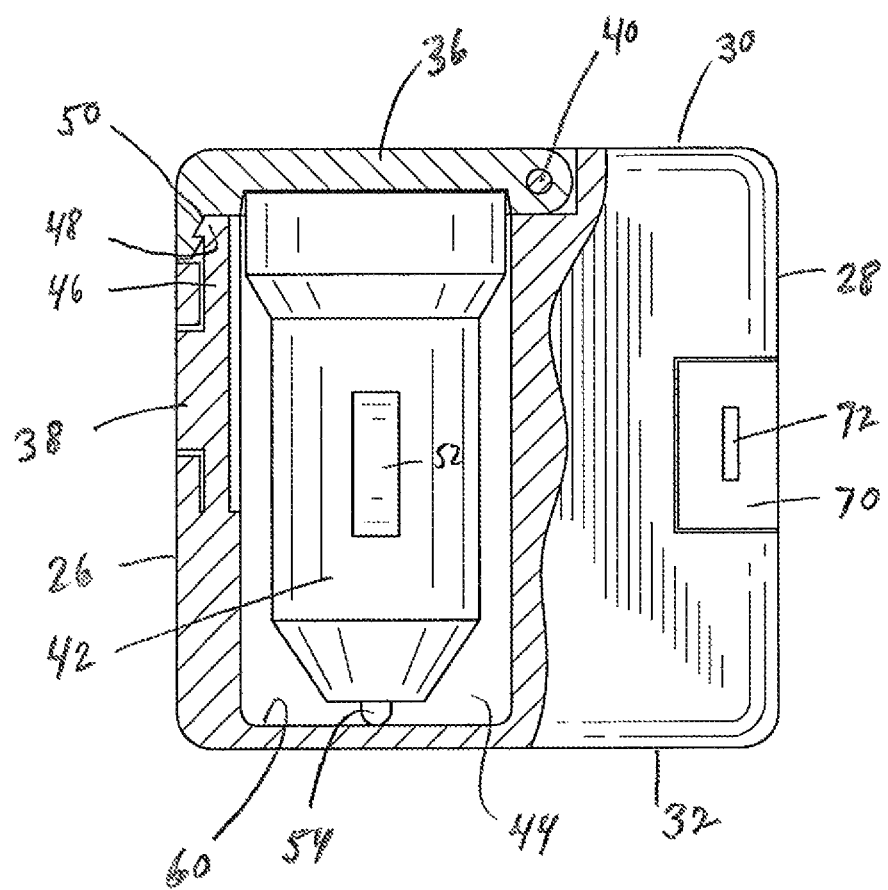
FIG. 2 is a partial sectional side view of the wall charger shown in FIG. 1.
Figure 3:
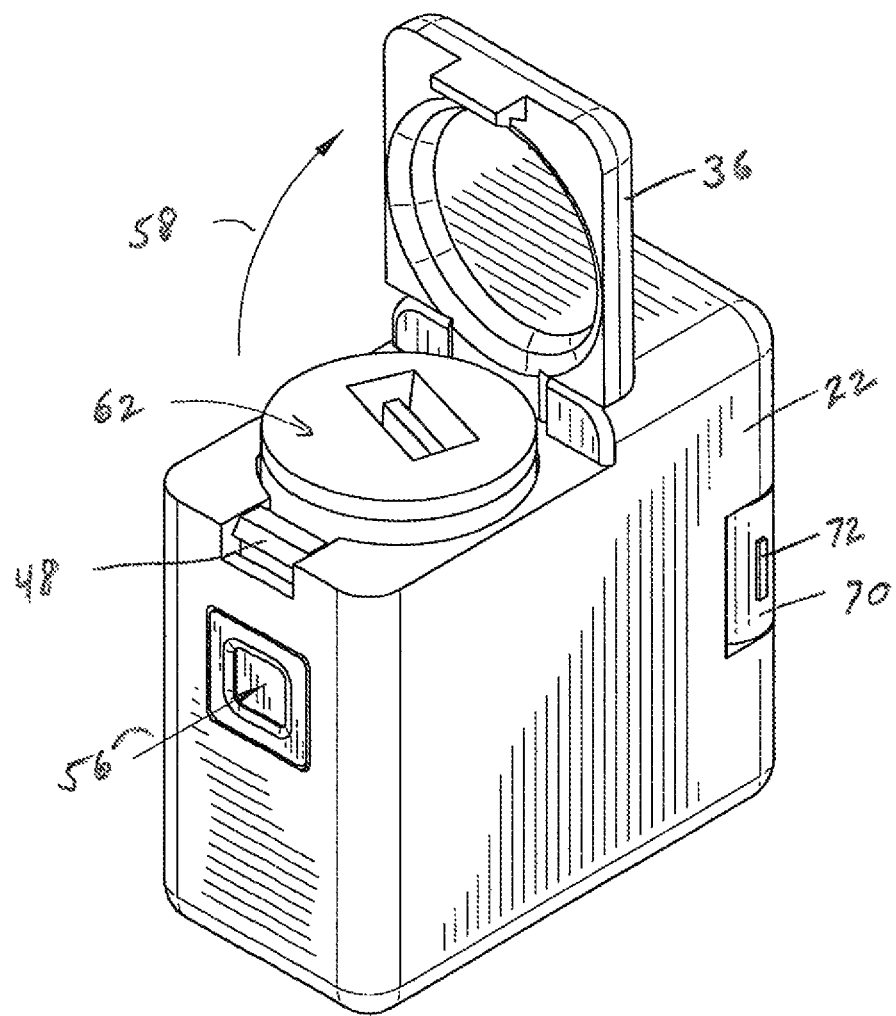
FIG. 3 is a perspective view with the cover to the cylindrical compartment of the wall charger being released and pivotally moved away from the compartment to expose a housed bullet charger.
Figure 4:
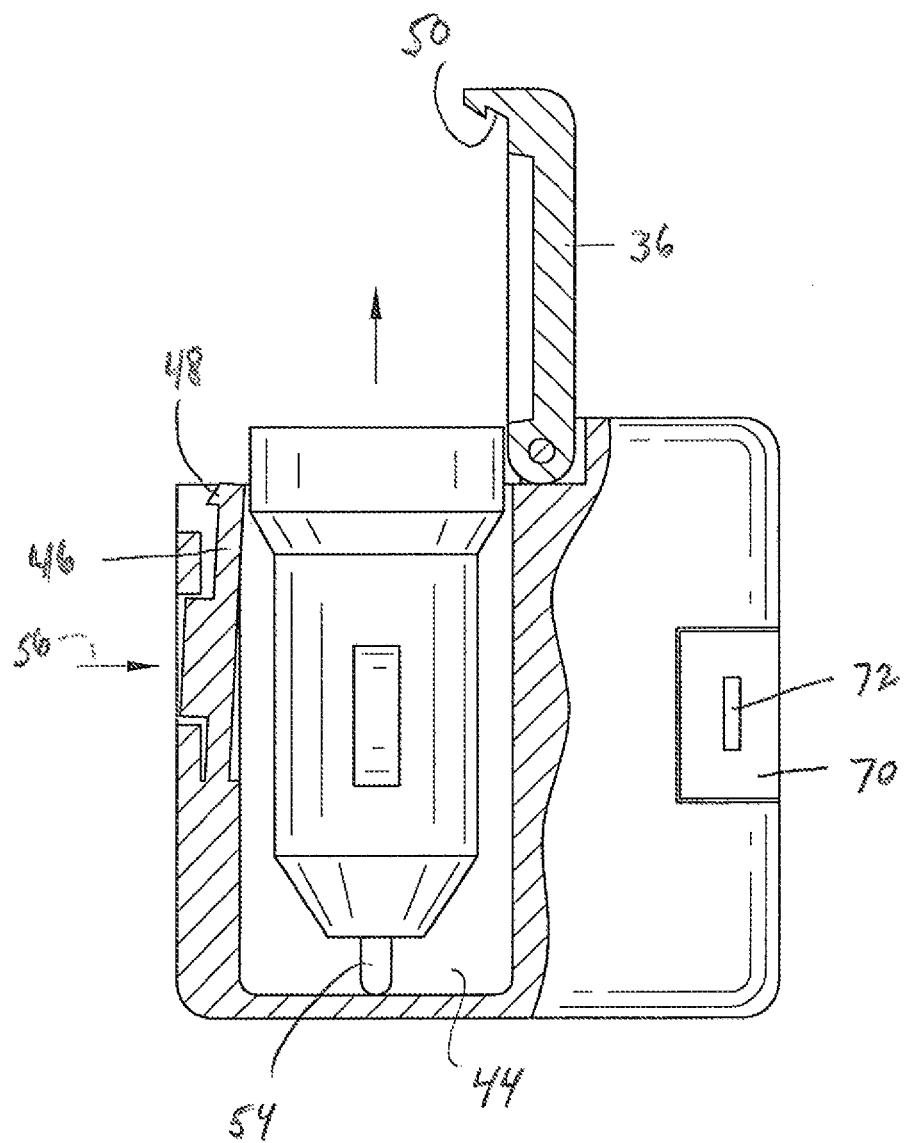
FIG. 4 is a partial sectional side view illustrating the movement of the bullet charger shown in FIG. 3.

As shown in FIGS. 2 through 4, the cover member 36 is pivotally mounted about pivot pin 40 to cover and contain a bullet charger 42 within a cylindrical compartment 44 until actuation of release button 38. The inward pressing of release button 38 moves a locking member 46 radially inwardly into compartment 44 so that tooth 48 is moved away from inter-engagement with recess 50 of the cover member 36.

The bullet charger 42 includes opposed contact portions 52 and spring biased contact button 54. When the cover portion 36 is released by depression of release button 38 moving in the direction of arrow 56, as shown in FIGS. 3 and 4, the cover member 36 is moved in the direction of arrow 58 by either a spring (not shown) about pivot pin 40 or the bias force release from contact button 54 pushing off the bottom wall 60 of cylindrical compartment 44. This also allows for the top portion 62 of bullet charger 42 to become exposed for removal from the wall charger.

Conversely, when the bullet charger is being stored in cylindrical compartment 44, the bullet charger initially projects from the cylindrical compartment 44 in the position shown in FIG. 3 and then by movement of the cover member 36 in the direction opposite to that of arrow 58 the bullet charger is forced down into the compartment 44. The tooth 48 is engaged in recess 50, securing the bullet charger in place.

Figure 5:
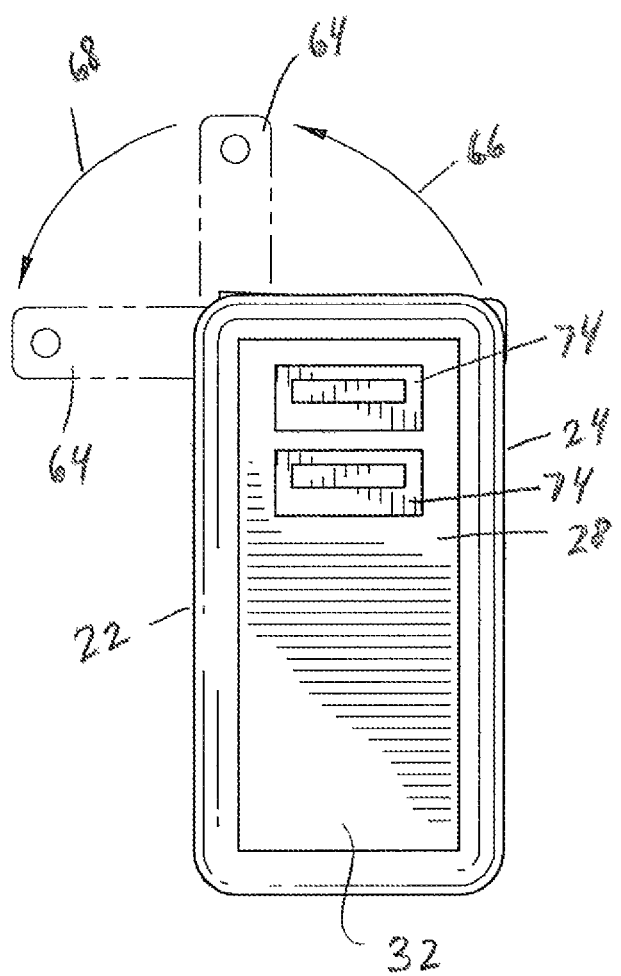
FIG. 5 is a side view illustrating the two USB ports on a side wall of the wall charger and the pivotally mounted AC prongs.

The wall charger 20 includes AC prongs 64 shown in dotted lines in FIG. 5. The prongs 64 are pivotally movable from a position of rest recessed within side wall 28. The prongs are movable to a position extending 90° when moved in the direction of arrow 66 or to 180° when further moved in the direction of arrow 68 from its at rest position. The AC prongs 64 are locked into the 90° extension position or the 180° extension position by a series of detents engaging with projection 72 of base portion 70 as the AC prongs are pivotally rotated. The AC prongs are used to provide electrical communication with two USB ports 74 located in bottom wall 32 for use in charging of electrical devices.

Figure 6:
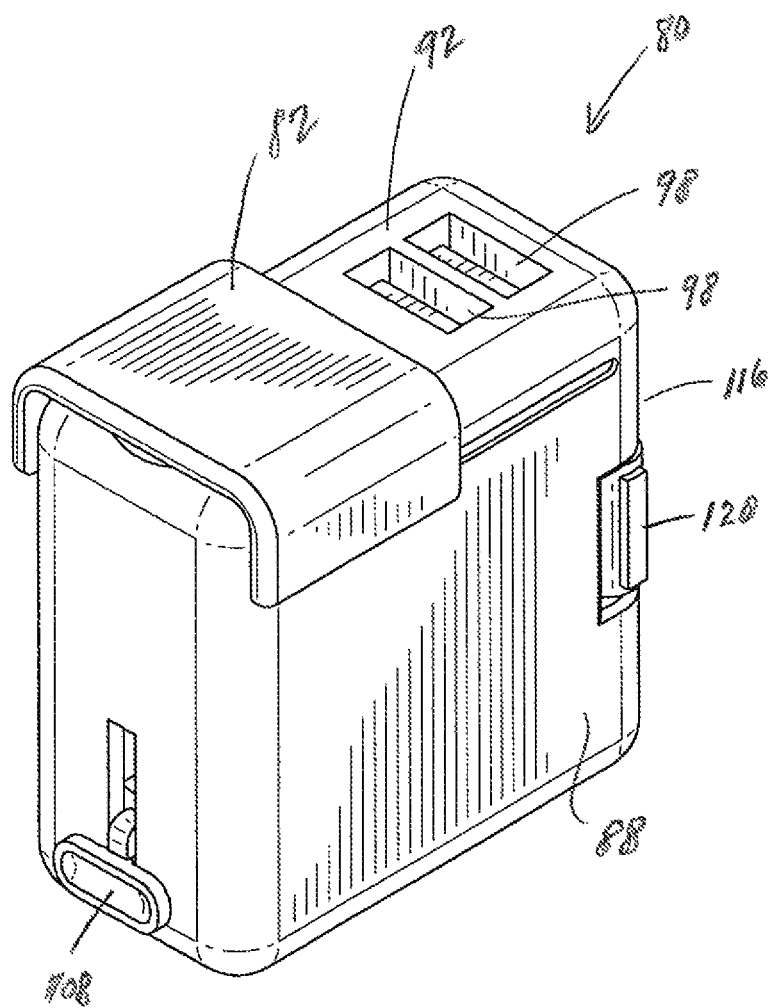
FIG. 6 is a perspective view of a second embodiment of a wall charger of the present invention.
Figure 7:
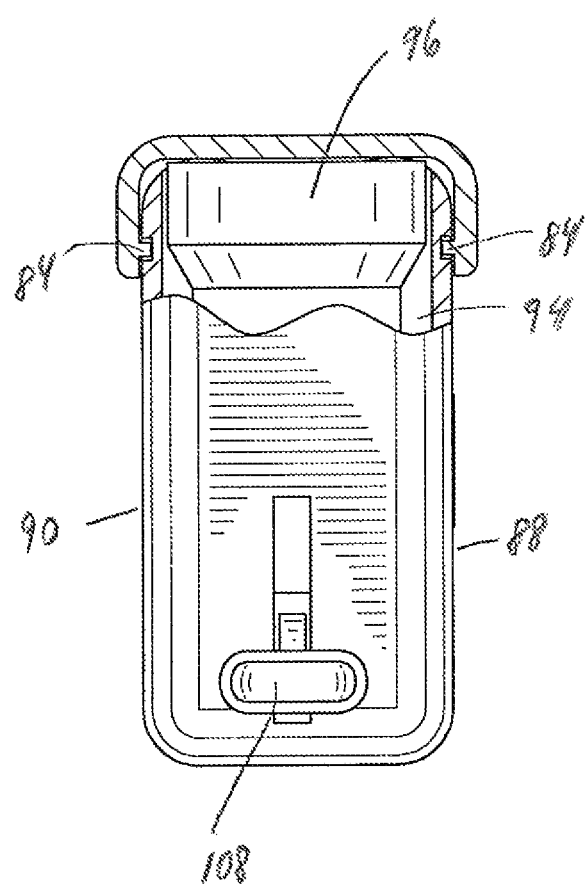
FIG. 7 is a partial sectional end view illustrating the bullet charger contained within a cylindrical compartment and covered by a slidable cover.

In an alternate embodiment, as shown in FIGS. 6 through 11, a wall charger 80 includes a slidable cover member 82. Cover member includes two opposing projections 84 which are slidable within recessed tracks 86 located on opposed sidewalls 88, 90. In this embodiment, the slidable cover member 82 is positioned on top surface 92 and is movable from a position as shown in FIG. 6 which covers a cylindrical compartment 94 which houses a bullet charger 96.

Figure 8:
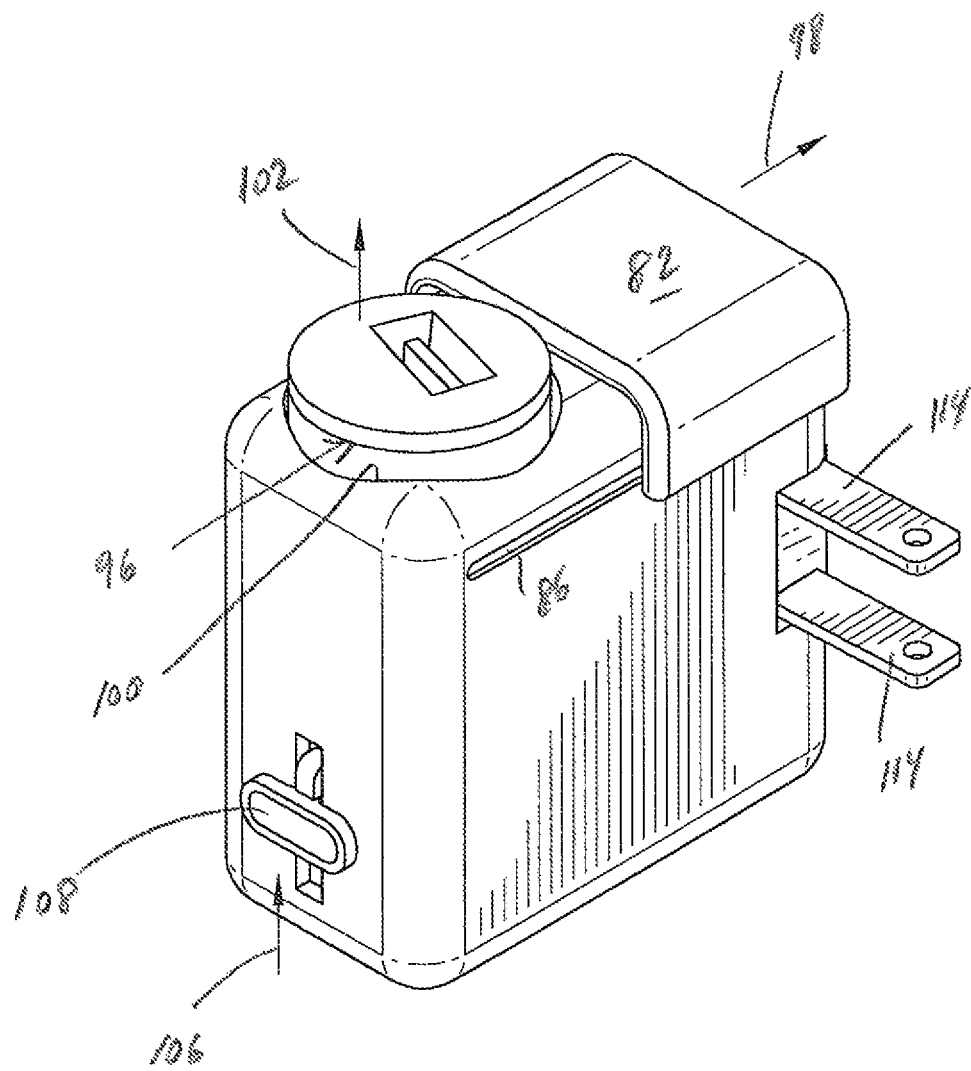
FIG. 8 illustrates the release of the bullet charger from the compartment in the wall charger after sliding of the cover and sliding of an actuating member located in a side wall of the wall charger.
Figure 9:
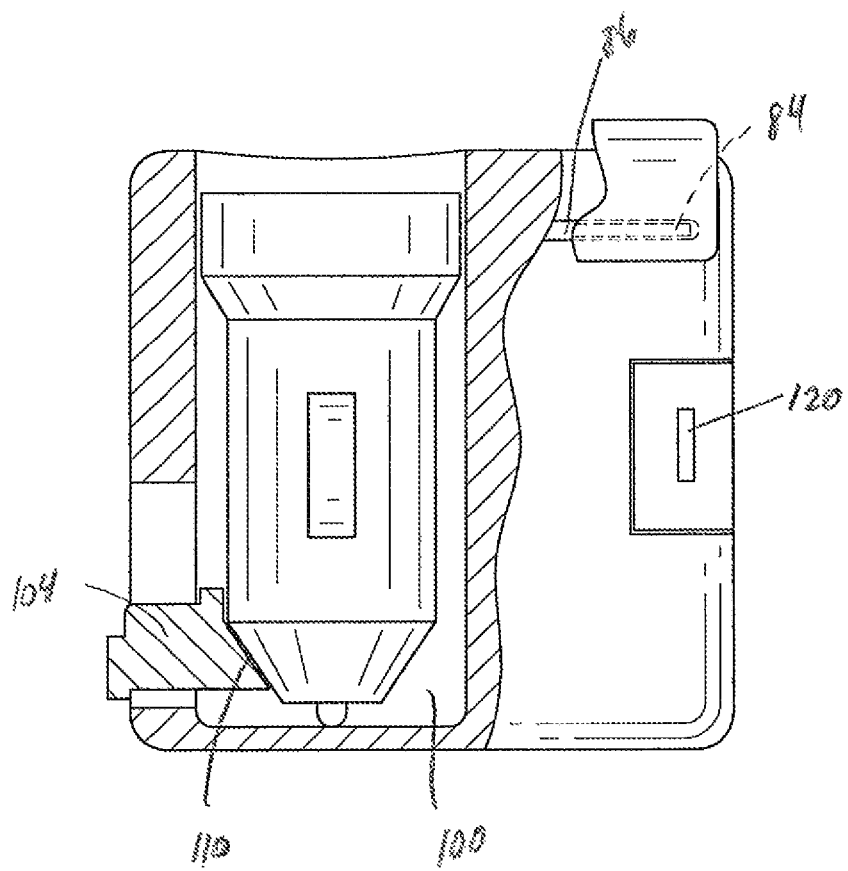
FIG. 9 is a partial sectional view illustrating the mechanism for moving the bullet charger out of the cylindrical compartment in the wall charger in an at rest position.
Figure 10:
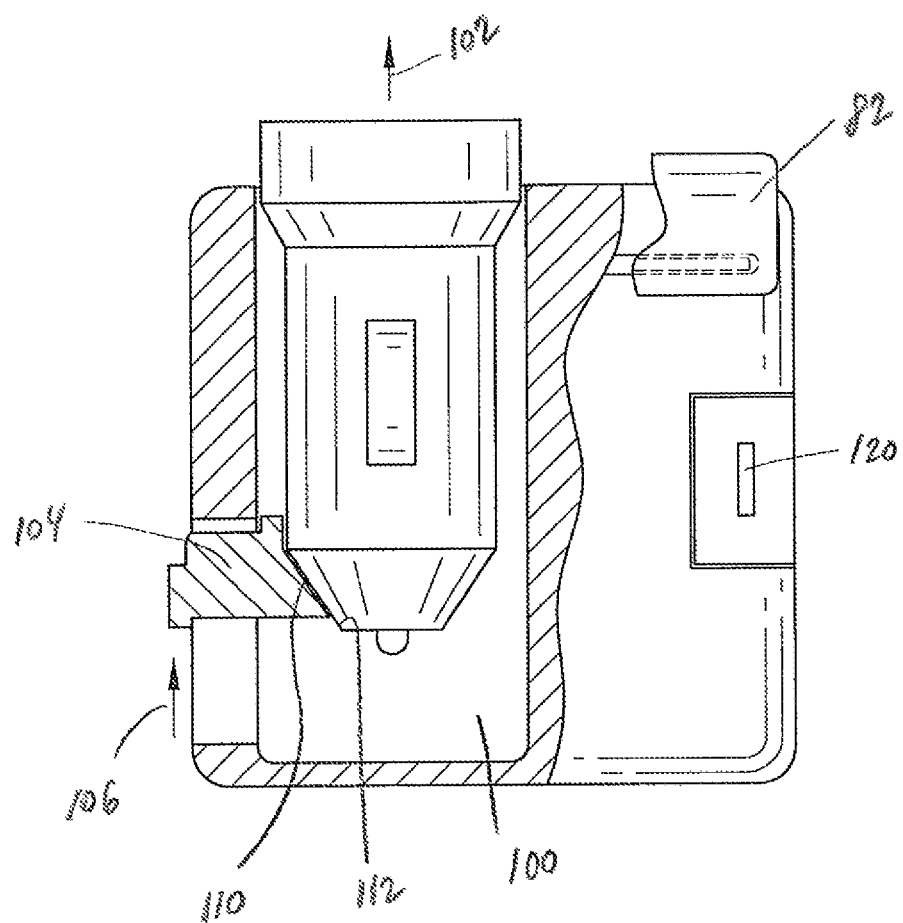
FIG. 10 is a partial sectional view demonstrating the elevation of the bullet charger out of the cylindrical compartment by actuation of the slide member.
Figure 11:
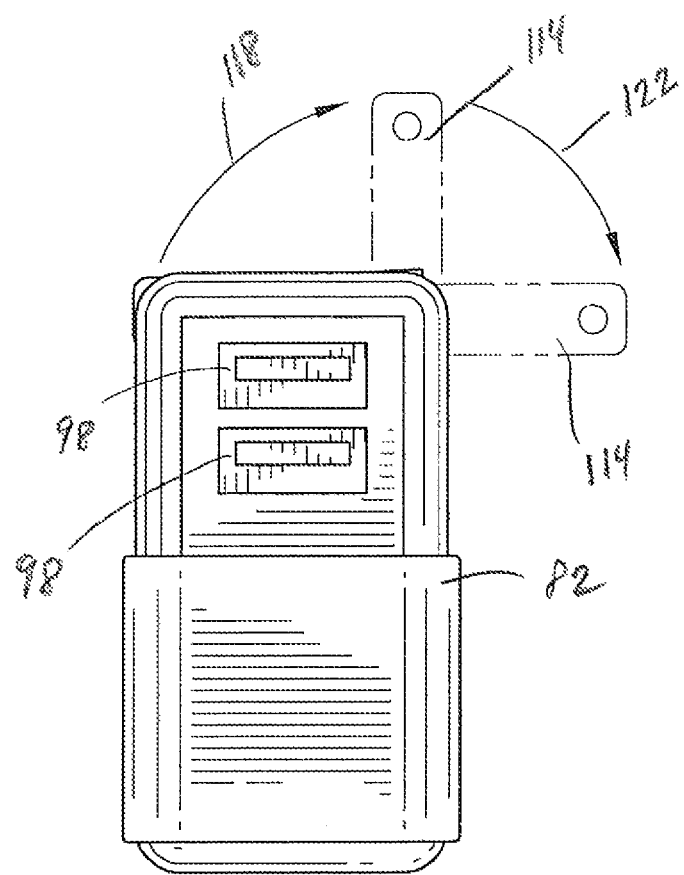
FIG. 11 is a top view with the slide cover over the bullet charger in the cylindrical compartment and exposing two USB ports and illustrating the pivotal movement of two AC prongs.
Figure 12:
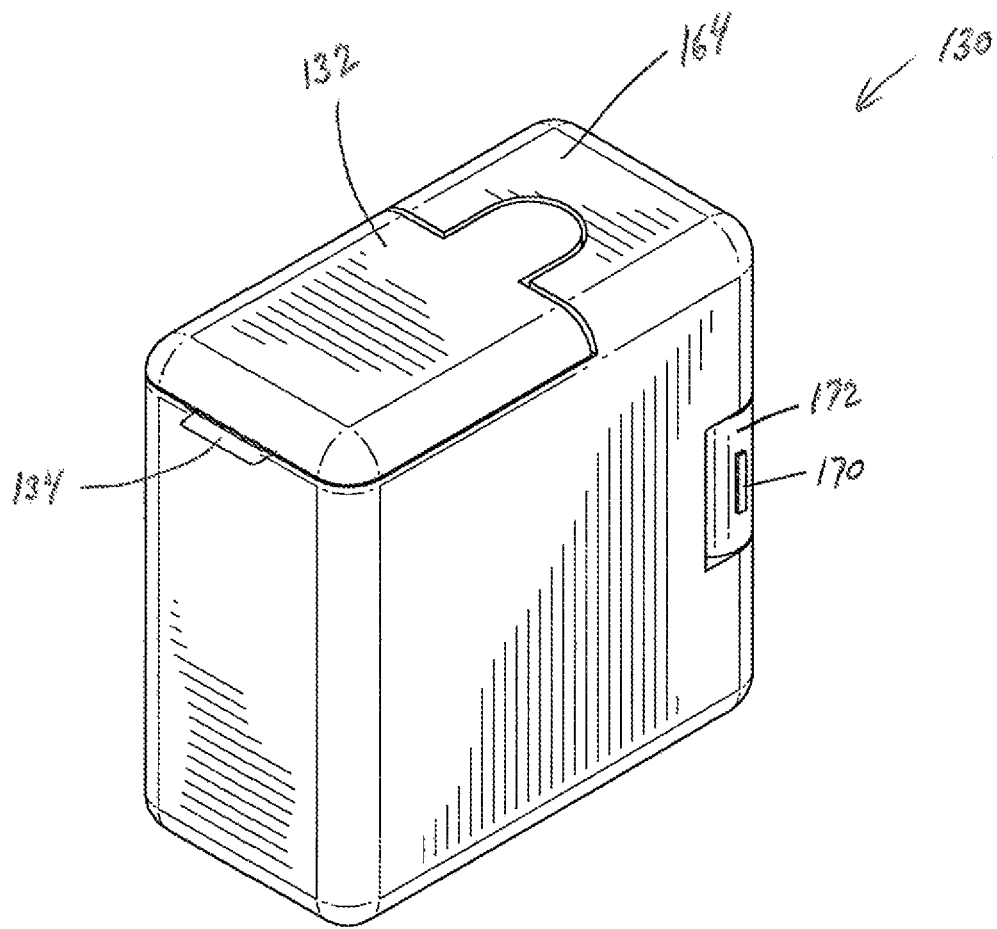
FIG. 12 is a perspective view of a third embodiment of a wall charger of the present invention.
Figure 13:
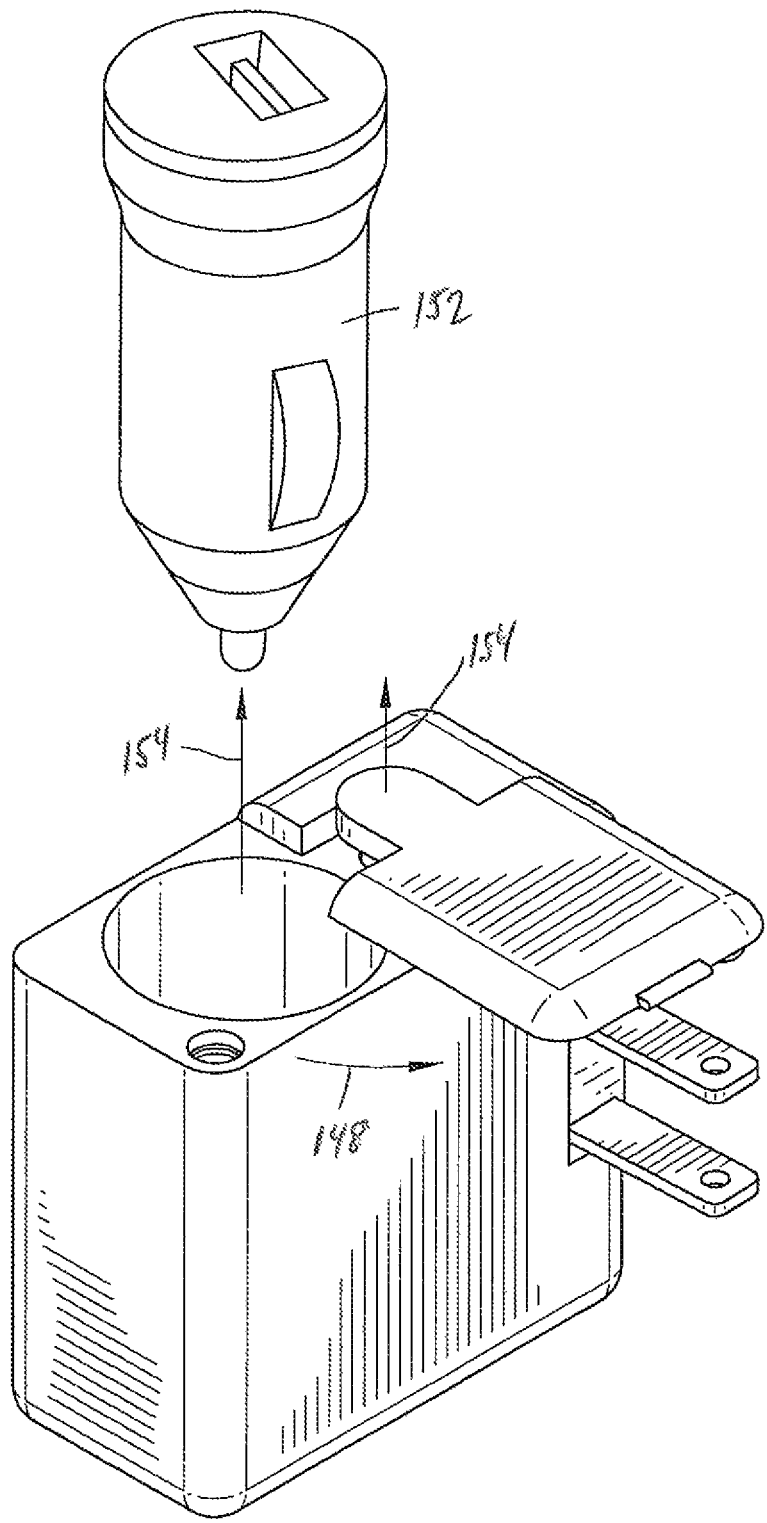
FIG. 13 illustrates the pivotal side movement of a cover member of the wall charger for movement of the bullet charger out of the cylindrical compartment of the housing.
Figure 14:
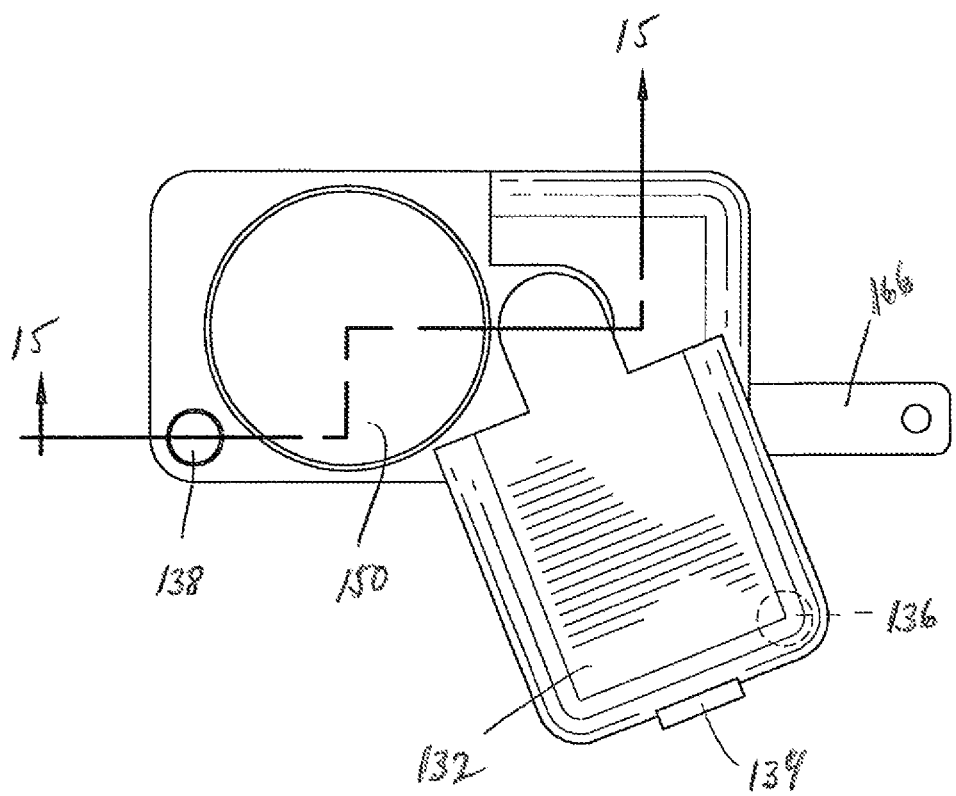
FIG. 14 is a top plan view illustrating the pivotal movement of the cover member for the bullet charger while the bullet charger is still located within the housing.
Figure 15:
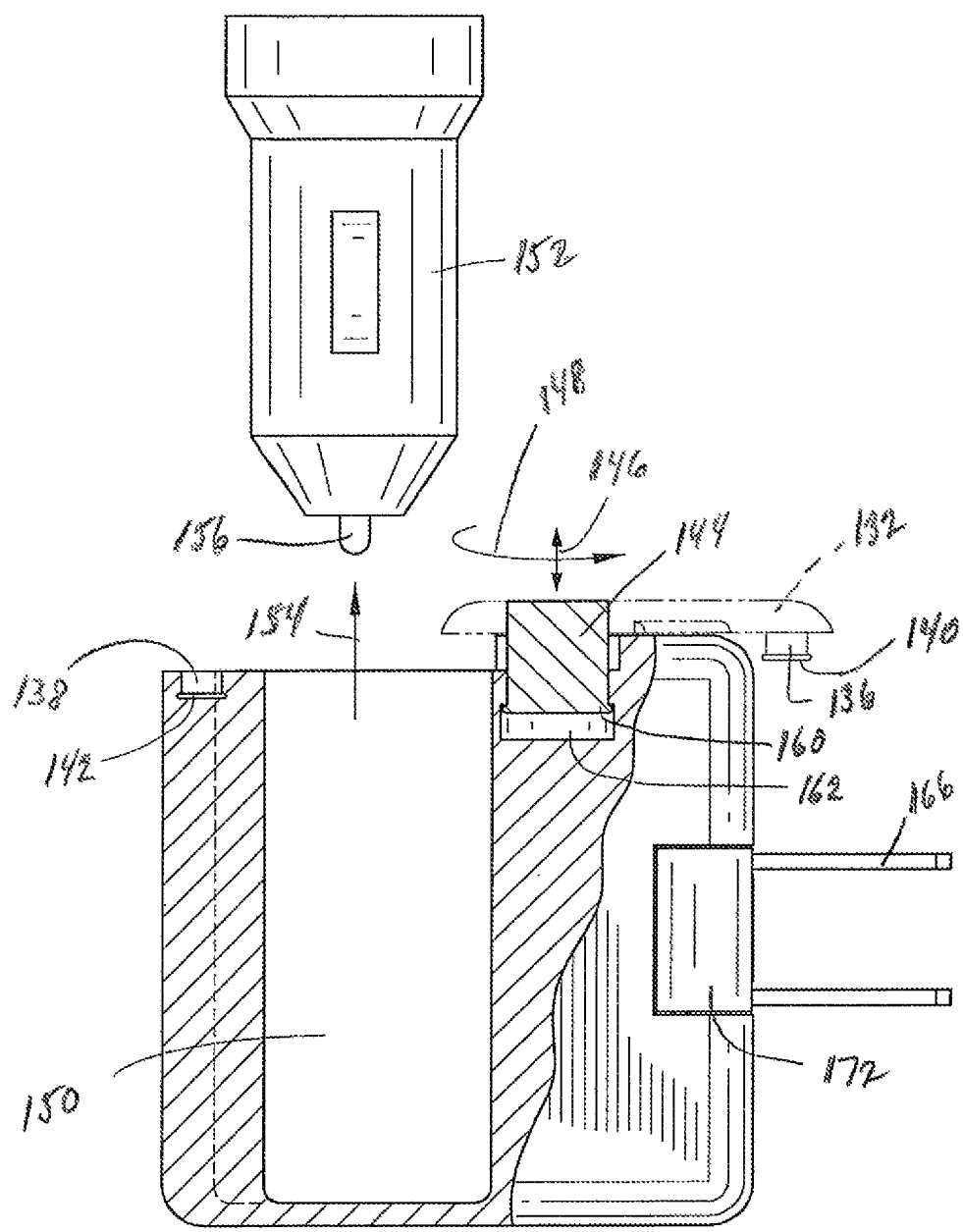
FIG. 15 is a partial sectional view taken along the sectional line 15-15 of FIG. 14 to illustrate the operation of movement of the pivotal cover away from the cylindrical compartment of the housing.
Figure 16:
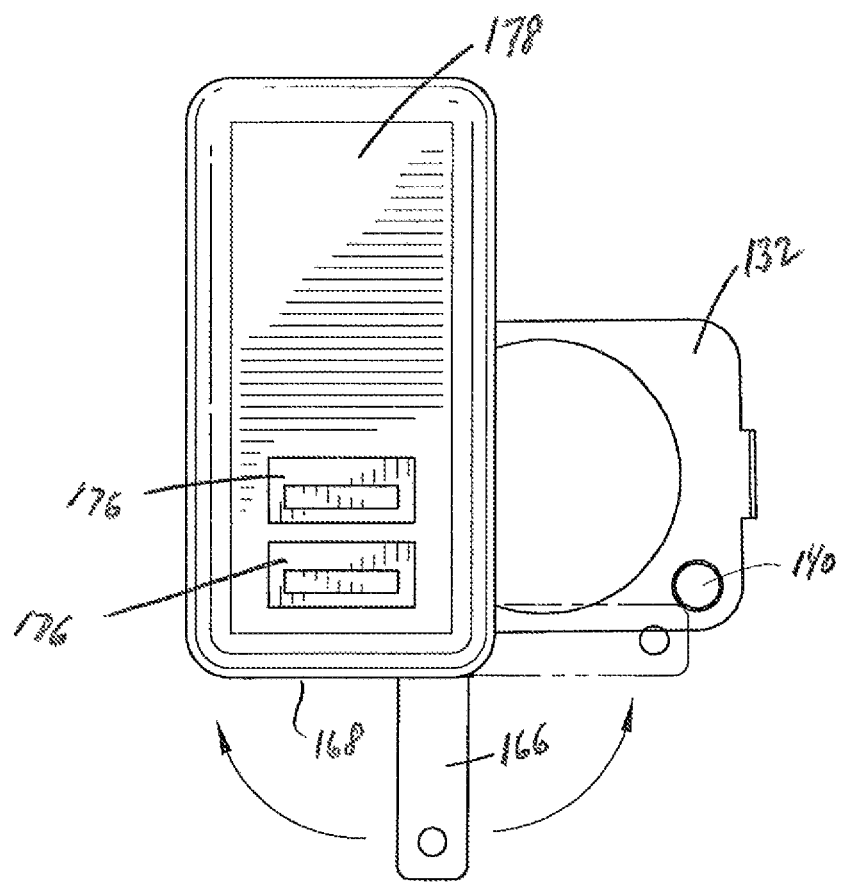
FIG. 16 is a bottom view of the housing illustrating the two USB ports located at the bottom of the housing, the pivotal movement of the cover member and the pivotal movement of the two AC prongs.

In an alternate position of the cover member 82, two USB ports 98 are covered by the cover member during release of the bullet charger 96 from the housing 80 by movement of the cover member in the direction of arrow 98. Bullet charger 96, in this embodiment, moves out of the cylindrical compartment 100 in the direction of arrow 102 as assisted by a slide member 104 moving in the direction of arrow 106, as shown in FIG. 10, by engagement with a tab 108, as shown in FIGS. 8 and 10.

The slide member 104 includes a sloped projection 110 which engages with an angled side wall 112 of the bullet charger. The movement of the slide member 104 in the direction of arrow 106 moves the bullet charger in the direction of arrow 102 for removal from the cylindrical compartment 100 after the sliding of the cover member 82 to the position shown in FIGS. 8 and 9.

In this embodiment, there are also two AC prongs 114 which are movable from a position of rest, recessed inside wall 116 to a position as moved in the direction of arrow 118 to project 90° from side wall 116. A projection 120 engages with a detent to lock the AC prongs in the 90° extension position or upon continued movement through the direction of arrow 122, into a position extending 180° from its position of rest in side wall 116. The 180° position is shown in FIG. 8.

In another embodiment, as depicted in FIGS. 12 through 16, a wall charger 130 is shown. In this embodiment, the movable cover member 132 is lifted vertically by manual engagement with tab 134. To lift the cover member 132, a pin 136 is removed from a cylindrical hole 138 which holds the pin 136 by a friction fit. A base portion 140 of the pin 136 is housed within an enlarged recess 142 located at the base of the hole 138. Once the cover member is disengaged from the hole 138, the cover member is elevated in the direction of arrow 146. The cover member is then free to be swung laterally about large pin 144 in the direction of curved arrow 148 so as to clear the cover member from blocking cylindrical chamber 150.

Bullet charger 152 is thereby free to move in the direction of arrows 154, out of the cylindrical chamber 150. The initial removal of the bullet charger from the cylindrical compartment may be caused by the spring force of button contact 156 at the base of the bullet charger.

The lifting and lateral pivoting of the cover member 132 is facilitated by sliding of a projection 160 at the base of a large pin 144 captured within an enlarged recess 162. When the projection 160 engages the top of the recess 162, the cover member has been elevated sufficiently to be moved laterally to clear over fixed portion 164 of the top of the wall charger.

In this embodiment, a pair of AC prongs 166 are pivotally mounted so that they may be moved into a position 90° or 180° from an at rest position housed within a side wall 168 of the wall charger. A projection 170 in the base portion 172 of the AC prongs engages in recessed detents for locking the AC prongs 166 in either the 90° or the 180° projecting position. The AC prongs 166 are electrically connected to two USB ports 176 located in bottom wall 178 of the wall charger.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A wall charger comprising
a housing having opposed end walls,
a recessed compartment within the housing,
a DC charging plug removably held within the recessed compartment, the DC charging plug including two longitudinally extending side contact portions and a spring biased contact button located at one end of the DC charging plug, and
a cover member at least partially covering one of the opposed end walls and covering said recessed compartment for holding the charging plug within the recessed compartment,
said cover member being movably mounted on said housing to gain access to said recessed compartment and to said charging plug so that when the cover member is moved to expose the recessed compartment, the spring biased contact button located at the one end of the DC charging plug forces the DC charging plug at least partially out of the recessed compartment when the cover member is removed from covering the recessed compartment.

2. The wall charger according to claim 1, wherein a pair of AC electrical connection prongs is pivotally mounted on said housing.

3. The wall charger according to claim 2, wherein said pair of electrical connection prongs are movable between a recessed position in the housing and one of a 90° extended position and a 180° extended position.

4. The wall charger according to claim 1, wherein said cover member is pivotally mounted on said housing about a pivot pin.

5. The wall charger according to claim 1, wherein said cover member is vertically movable away from the housing.

6. The wall charger according to claim 5, wherein said cover member is pivoted laterally away from said housing after the cover member is lifted vertically away from the housing.

7. The wall charger according to claim 1, wherein the housing includes at least one USB port in a side wall of the housing.

8. The wall charger according to claim 1, wherein a slide member assists in moving the DC power charger out of the recessed compartment.

9. The wall charger according to claim 1, wherein a push button in a sidewall of the housing releases said cover member.

10. The wall charger according to claim 1, wherein said cover member is slidably mounted on said housing.

11. The wall charger according to claim 5, wherein said cover member is pivotal 90° with respect to said housing.

12. The wall charger according to claim 8, wherein the slide member includes an angled surface for engaging with a complementary angled surface of the DC power charger.

13. The wall charger according to claim 8, wherein said slide member extends into said recessed compartment through a side of the housing.

14. The wall charger according to claim 13, wherein said slide member is longitudinally slideable along said side of the housing.

15. The wall charger according to claim 13, wherein said slide member also projects out of the housing.

16. The wall charger according to claim 1, a length of the recessed compartment is less than a length of the DC charging plug so that the spring contact button is depressed when the DC charging plug is in the recessed compartment and the cover member extends over the DC charger plug.

* * * * *